(12) United States Patent
Madden (10) Patent No.: US 10,621,610 B2
(45) Date of Patent: *Apr. 14, 2020

(54) MACHINE-LEARNING BASED SYSTEMS AND METHODS FOR OPTIMIZING SEARCH ENGINE RESULTS

(71) Applicant: The Bartley J. Madden Foundation, Naples, FL (US)

(72) Inventor: Bartley J. Madden, Naples, FL (US)

(73) Assignee: The Bartley J. Madden Foundation, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,205

(22) Filed: Apr. 10, 2019

(65) Prior Publication Data

US 2019/0295116 A1    Sep. 26, 2019

Related U.S. Application Data

(63) Continuation of application No. 15/933,983, filed on Mar. 23, 2018, now Pat. No. 10,410,234.

(51) Int. Cl.
*G06Q 30/00* (2012.01)
*G06Q 30/02* (2012.01)
*G06N 20/00* (2019.01)

(52) U.S. Cl.
CPC ......... *G06Q 30/0224* (2013.01); *G06N 20/00* (2019.01); *G06Q 30/0222* (2013.01); *G06Q 30/0271* (2013.01); *G06Q 30/0277* (2013.01)

(58) Field of Classification Search
USPC .......................................... 705/14
See application file for complete search history.

(56) References Cited

U.S. PATENT DOCUMENTS

| | | | |
|---|---|---|---|
| 8,447,651 B1 | 5/2013 | Scholl et al. | |
| 8,732,010 B1 | 5/2014 | Parikh et al. | |
| 2009/0061884 A1 | 3/2009 | Rajan et al. | |
| 2014/0040245 A1 | 2/2014 | Rubinstein et al. | |

*Primary Examiner* — Yehdega Retta
(74) *Attorney, Agent, or Firm* — Marshall, Gerstein & Borun LLP; Randall G. Rueth (57) ABSTRACT

Machine-learning based systems and methods are described for optimizing search engine results. A server receives, via a computer network, and associates, via a user profile, user information including search requests, transaction details, and/or profile information, for which a user receives purchasing units. The server executes a machine-learning component to predict, based on the user information, a user action score defining a probability of a user to engage in a new transaction. The server executes a search engine optimization component that receives, from the user's device, a new search request causing the search engine optimization component to generate a search engine offer associated with the new transaction. The server transmits the search engine offer to, and receives an acceptance from, computing device(s) of search engine market participant(s), the acceptance causing a targeted advertisement and search results to be returned to the user device in response to the new search request.

23 Claims, 4 Drawing Sheets

MACHINE-LEARNING BASED SYSTEMS AND METHODS FOR OPTIMIZING SEARCH ENGINE RESULTS

The present application is a continuation of U.S. patent application Ser. No. 15/933,983, entitled "MACHINE-LEARNING BASED SYSTEMS AND METHODS FOR OPTIMIZING SEARCH ENGINE RESULTS," filed on Mar. 23, 2018, the disclosure of which is hereby incorporated herein by reference.

FIELD OF THE DISCLOSURE

The present disclosure generally relates to online search engines, and, more particularly, to optimizing online search engine results, including, for example, optimizing search engine results to include search engine offers to search engine market participants and targeted advertisements to search engine end users.

BACKGROUND

In today's online environment, users may choose from a multitude of Internet search engines, e.g., Google, Yahoo, Bing, etc., to submit search requests and for a variety of information needs, which may include, for example, conducting online research, engaging in product or service searches, or otherwise exploring content on the world wide web and/or searching the Internet in general. Typically, when users submit such information (e.g., search requests) to Internet search engines, the respective search engine providers (e.g., Google) may store such information. However, the users are generally not incentivized, or otherwise compensated, for the information they submit. This may create a problem, or at least a lost opportunity to users, because in today's modern, information-based economy, such search requests or other information, is increasingly valuable. For example, such information may be used in a variety of "Big Data" applications. Currently, however, the value of such user information is neither clearly known nor is it monetized to the benefit of search-engine users.

Search engine providers can maintain a search history of users past searches. This search history may be made available to advertisers who may desire to pay the search engine provider for opportunities to deliver advertisements to users based on past searches. Oftentimes, advertisers do not, however, get direct feedback as to whether or not users subsequently purchase advertised products. For example, users may click a link in an advertisement to view additional product details, but the user may not end up actually purchasing the product. In any event, the advertiser would not receive a verification of an actual purchase.

Other similar problems exist for current search engines, in that, today, current search engine providers must deal with at least two competing, and potentially conflicting, motivations. Namely, those of search engine users on the one hand, and those of search engine advertisers on the other hand. Particularly, search engine providers need to provide useful information in response to the user's search request. At the same time, however, search engine providers must also meet the needs of advertisers, who often desire to influence the information returned to the user via paying the search engine provider to inject specific advertisements. For some search engines, the paid advertisements heavily influence not only the information displayed to the user, but also the priority in which such advisements is displayed. For example, a search request submitted by a user for a local plumber may result in a response with advertisements, or other responsive information, displayed at the top of a list, prioritizing those plumbers (or other advertisers) who paid the most to the search engine provider. Such responsive list may compete with, or otherwise be in conflict with, the user's ultimate objective, which may be to identifying a highly qualified plumber at a best, or reasonable, price point. Thus, the conflicting or competing motivations of each of the search engine users and search engine advertisers creates a problem that detracts from both search engine users and search engine advertisers in that, on the one hand, search engine users experience less useful search results, and, on the other hand, search engine advertisers may experience a mismatch of their specific advertisements to desired users, and, therefore waste advertising expenditures on payments to search engine providers to target the wrong users, or at least users who won't end up actually purchasing the products as advertised.

Thus, systems and methods are needed to optimize search engine results, as disclosed herein, to address these and other problems experienced by search engine users and search engine advertisers when utilizing or otherwise engaging conventional search engines, search engine providers, etc.

BRIEF SUMMARY

In contrast to conventional search engines or related technology, the machine-learning based systems and methods for optimizing search engines (i.e., the machine-learning based platform), as described herein, provide a variety of unique, and interconnected, incentives for both search engine users and search engine market participants (e.g., search engine advertisers) to facilitate the flow of useful information. Such information may include, for example, user search requests, user transaction details, and/or user profile information, as described herein. The machine-learning based platform, as described herein, provides an economically-sound approach for search-engine users to receive compensation (e.g., purchasing units), or otherwise additional incentives, for the use of their information, and, at the same time, provides search engine market participants with the ability to accept machine-learning based search engine offers in order to target specific users with targeted advertisements.

For example, in various embodiments, the machine-learning based systems and methods described herein may incorporate machine-learning and other components that perform a multitude of tasks to yield new benefits to both search-engine users and search engine market participants. In some embodiments, this may also be done in a manner that simultaneously enables the machine-learning based systems and methods (e.g., via a machine-learning based platform described herein) to adjust compensation and/or incentives provided to users, and to adjust fees charged to search engine market participants, merchants, or other participants in the in the machine-learning based platform, in a manner, for example, to optimize the profits of an operator of the machine-learning based platform. In any event, because users are compensated (e.g., via purchasing units as described herein) for their submission of personal information (e.g., search requests and the like), users are motivated to voluntarily submit search requests, transaction details, profile information, or other information described herein that is useful to search engine market participants. For example, user profile information may include insurance payments for automobiles owned, real estate tax receipts, and the like which may be used to objectively assess user buying power. Such user information may describe a user's interests or other personal information, and, in general, be used to assist the machine-learning based platform disclosed herein to generate user search engine offers and targeted advertisements to the benefits of search engine users and search engine market participants.

For example, as described for various embodiments herein, machine-learning based systems and methods may be implemented via an online machine-learning based platform comprising computer server(s), computing device(s), or otherwise processor(s) for optimizing search engine results. For example, in various aspects, the machine-learning based systems and methods may utilize one or more server(s) that include one or more processors and one or more memories. The server(s) may be configured to receive, via a computer network, one or more search requests of a user, one or more transaction details of the user, and/or profile information of the user. The server(s) may also be configured to generate or update a user profile of the user such that the user profile becomes associated with, for example, in the one or more memories of the server(s), the one or more search requests, the one or more transaction details, and the profile information of the user.

The server(s) may also execute a machine-learning component on the one or more processors of the server(s). The machine-learning component may be trained, or otherwise configured, to predict, based on the one or more search requests, the one or more transaction details, and/or the profile information, a user action score defining a probability of the user to engage in a new transaction.

The server(s) may also execute a search engine optimization component on one or more processors of the server(s). The search engine optimization component may be configured to receive a new search request associated with the new transaction from a user device of the user. The new search request may cause the search engine optimization component to generate, based on the new search request and the user action score, a search engine offer. The search engine offer may include a targeted advertisement for the user. The search engine offer may also include one or more dynamic coupons as described herein.

The servers(s) may be further configured to transmit, via the computer network, the search engine offer to one or more computing devices of one or more corresponding search engine market participants. The server(s) may receive, via the computer network, an acceptance of the search engine offer from at least one of the computing devices of at least one of the one or more search engine market participants. Such acceptance may cause the targeted advertisement and the search results to be returned to the user device in response to the new search request.

The machine-learning based systems and methods, as described herein, provide several benefits including that the machine-learning based systems and methods enable search engine users to be compensated, or paid, or otherwise incentivized (e.g., via purchasing units) for the use of their information while simultaneously assisting search engine market participants to better identify and target specific users. In so doing, the machine-learning based systems and methods may also optimize the profits earned by an operator of the machine-learning based systems and methods thereby providing an incentive for the platform provider. In addition, the machine-learning based platform may operate a virtuous cycle, across many iterations or generations of data and machine-learning models, where the machine-learning based systems and methods may provide a centralized platform of user information and data that grows in size and proportion to the value received by search engine users thereby, for example, providing the machine-learning algorithms and component with more data (e.g., features and labels) to allow for more accurate forecasts or probability predictions of users buying products or services in response to targeted advertisements.

The disclosed machine-learning based systems and methods provide additional benefits, including that search engine users are incentivized to submit both verified and non-verified personal information that, through the machine-learning component described herein, provide the search engine market participants with the ability to achieve a higher success rate with targeted advertisements for users than compared with traditional search engine platforms. As described herein, for some embodiments, a user may benefit from having a user profile that may be associated with "purchasing units," which the user may receive, for example, in return for providing user information to the machine-learning based platform. The user's purchasing units and user profile may form a "digital bank" of the user via the machine-learning based platform. In other embodiments, the digital bank may be a third-party bank that accepts, transmits, and/or manages purchasing units on behalf and/or with the user, for example, via the user's profile at the machine-learning based platform as connected, via a computer network, to the user's remote bank. As described herein, the purchasing units may be used to purchase, or otherwise be applied towards, transactions (e.g., for goods or services) that may be offered via search engine offers and targeted advertisements via the machine-learning based platform or otherwise as described herein.

In some embodiments, the user may review, receive, and/or store in his or her digital bank/user profile, various "dynamic coupons." Dynamic coupons may be generated by the machine-learning based platform that utilizes the user's personal information, verified purchases, search history, or other information described herein. The dynamic coupons may be included in a search engine offer generated by the machine-learning based platform in order to match search engine user interests with targeted advertisements of search engine market participants. In addition, dynamic coupons may include coupon terms (e.g., value and/or expiration date) that may be adjusted by search engine market participants. For example, a search engine market participant may adjust, issue, or otherwise provide a dynamic coupon in order to incentivize user transactions.

The machine-learning based platform described herein also allows users to choose between physical stores and online merchants or stores to minimize the total cost of user transactions, including, for example, delivery charges. In so doing, the machine-learning based platform is able to automatically add new user information, e.g., verified transactions or purchases, and other information described herein, for use with the machine-learning component, and, the same time, determine the quantity of purchasing units that the user's digital bank and/or user profile receives as a result.

In accordance with the above, and with the disclosure herein, the present disclosure includes improvements in computer functionality, or in improvements to other technologies, at least because, e.g., the disclosed machine-learning component is configured to execute on one or more processors (e.g., of a server) to predict, based on one or more search requests, one or more transaction details, or profile information, a user action score defining a probability of a user to engage in a new transaction, and because the disclosed search engine optimization component is configured to receive a new search request from a user device of the user and to, based on the new search request and the user action score, generate a search engine offer associated with the new transaction, where the search engine offer is transmitted to and accepted by search engine market participants. This improves over the prior art at least because such prior art search engines failed to generate a search offer that may be accepted and/or adjusted (e.g., via a dynamic coupon) by a search engine market participant before sending a related targeted advertisement to a user, to thereby provide specific user targeting.

For the same reasons, the present disclosure includes specific features other than what is well-understood, routine, conventional activity in the field, and/or adds unconventional steps that focus on a particular useful application as described herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Figure 1:
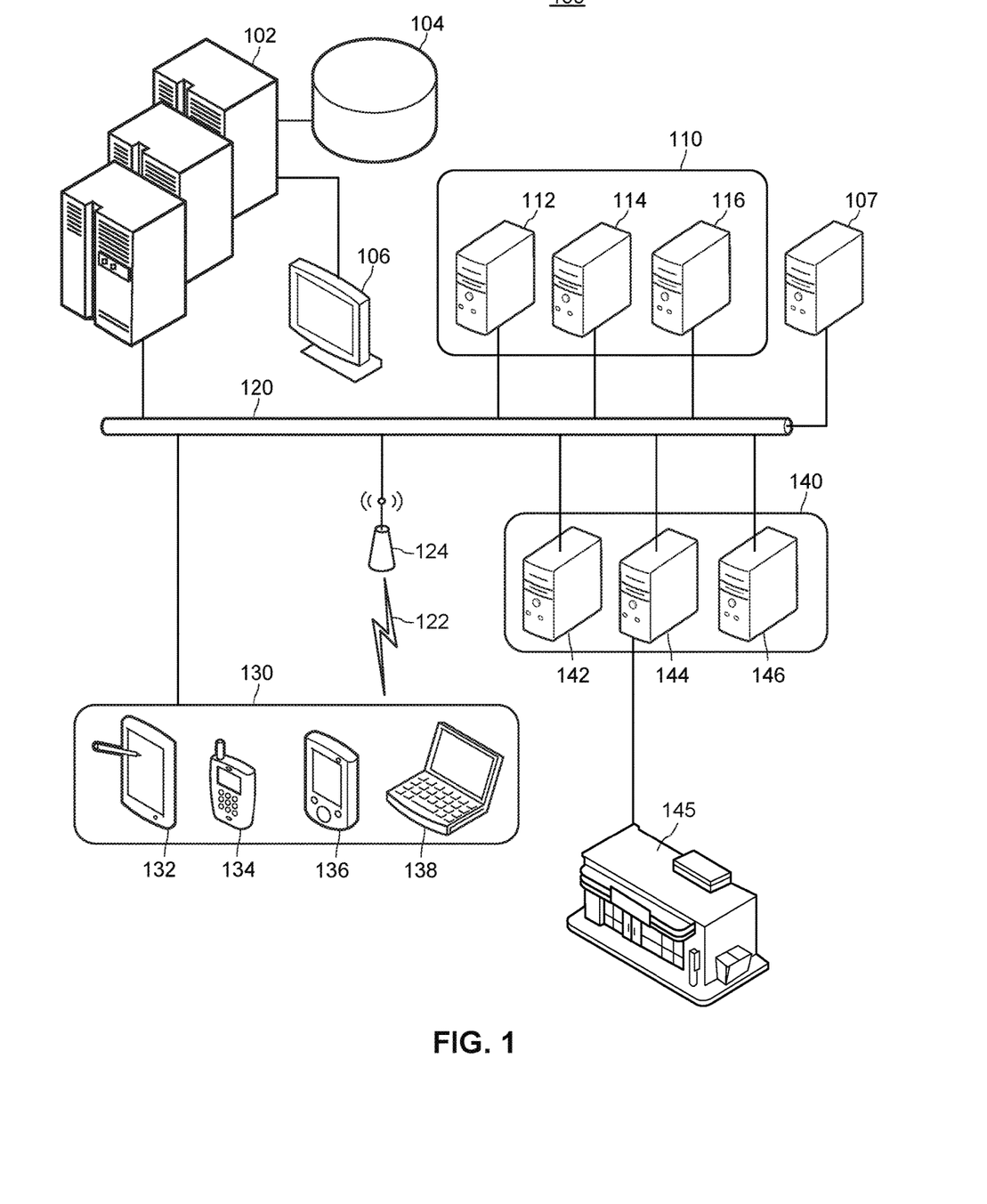
FIG. 1 illustrates an example network diagram including a machine-learning based platform configured to optimize search engine results in accordance with the present disclosure.

FIG. 1 illustrates an example network diagram 100 including a machine-learning based platform configured to optimize search engine results in accordance with the present disclosure. For example, the machine-learning based platform could be implemented on one or more server(s) 102. The server(s) 102 may include one or more processor(s), one or more computer memories, one or more networking ports, and/or other computing modules or components as described, for example, for FIG. 4 herein. The server(s) 102 may implement one or many operating systems such as Microsoft Windows, Linux, Unix, or the like. In one embodiment, the machine-learning based platform could be accessed, managed, administered, or operated by an operator or an administrator via a local terminal 106. In other embodiments, the machine-learning based platform could be accessed, managed, administered, or operated by the operator or administrator remotely, such as via computer network 120.

The server(s) 102 may implement several client-server platforms, such as ASP.NET, Java J2EE, Ruby on Rails, Node.js, or other client-server platform or technology to allow the server(s) to receive and respond to computer network requests, such as user search requests, or otherwise receive information or data such as transactional details, user profile information, and/or other data or information as described herein. Similarly, the server(s) 102 may expose one or more network-based application programming interfaces (APIs), including, for example, a web service based API or a representation state transfer (RESTful) API to receive network based API requests from remote devices and provide respective responses. The user search requests, transactional details, user profile information, and/or other data or information may be stored in the one or memories of the server(s) 102, which may include or be structured via, for example, one or more database(s) 104. The one or more database(s) 104 may be implemented, for example, as any of one or more relational database(s) (e.g., via Oracle DB, IBM DB2, MySQL, etc.) and/or as one or more NoSQL database(s), e.g., via MongoDB.

The memory of the server(s) 102 (e.g., such as memory 406) and/or database(s) 104, which are used interchangeably herein, may store users search request(s) as search histories. Each user may have a user profile where the user profile of the user becomes associated with, in the memory of the server(s) 102, the search history of the user. The user profile and user search history may be associated in the server(s) 102 memory, for example, via one or more tables, columns, keys, or otherwise of a relational database (e.g., database(s) 104), or other database. The memory of the server and/or database(s) 104 may also store transactional details of users, where such transactional details may represent, and/or include information regarding user purchases including for goods or services that the user has purchased in the past. Such transactional details may include, but is not limited to, for example, a purchase date, a purchase amount, a product or service description, a merchant description from which the product or service was purchased, information as to whether a dynamic coupon was used, payment information, or other such similar transactional detail information. The memory of the server and/or database(s) 104 may also store profile information of users (i.e., user profile information), which may include, for example, information regarding particular users such as tax-related information, insurance information, driver-related information, wealth or asset information, liability or debt information, or other such personal information of individual users. Each user profile and each user's respective user profile information and transactional details may be associated in the memory of the server(s) 102, for example, via one or more tables, keys, or other associations of a relational database (e.g., database(s) 104), or other database.

The server(s) 102 may be configured to execute, via one or more processor(s) of the server(s), one or more components of the machine-learning based platform, including, for example, a machine-learning component. As described herein, the machine-learning component may be configured to predict user action scores using a machine-learning model trained on user search requests, user transaction details, and user profile information. As descried herein, the user action scores may define a probability or likelihood of users engaging in new transactions, for example, for various products or services. In some embodiments, the products or service may be those offered by, or those associated with, one or more merchants participating with, or otherwise using, the machine-learning based platform. For example, in at least one embodiment, a user new user search request may be transmitted to the machine-learning based platform. This may initiate a machine-learning component to assemble information about the user from the verified personal information database, non-verified personal information database, verified purchases database, search history database, etc. With this user information and the specified search request, the machine-learning component may generate a user economic analysis. This analysis may estimates the probability of a purchase being made by the user after exposure to a targeted advertisement and possibly a related dynamic coupon.

The user search requests, transactional details, user profile information, and/or other data or information as described herein may be received from various sources via computer network 120, including, for example, from users (e.g., via user devices 130), from search engine market participants (e.g., via computing devices 112-116 of various search engine market participants 110), and/or from online or physical merchants or stores (e.g., via computing devices 142-146 of various online or physical merchants 140), or from other such sources. Computer network 120 may include any private network or public network, including a wide area network such as the Internet.

For example, in some embodiments, search requests, transactional details, and/or user profile information may be received, via computer network 120, from users from various user devices 130. User devices 130 may include, for example, tablet devices 132, mobile phones 134, smart phones 136, or other computer devices, such as laptop 138. The user devices 130 may implement a variety of operating systems, including, for example, Apple iOS, Google Android, Microsoft Windows, MacOS, etc. In some embodiments, the user devices 130 may transmit information (e.g., search requests, transactional details, and/or user profile information) via wireless communication 122 to a wireless base station 124 connected to computer network 120. For example, in some embodiments, the wireless communication 122 may be based on the IEEE 802.11 standard (WiFi) standard or Bluetooth standard. In other embodiments, the wireless communication may be based on one or more cellular standard such as GSM, CDMA, UMTS, LTE where the base station 124 may be, for example, a cellular base station or tower that may receive and respond to the mobile devices 130's wireless communication 122 via cellular transceivers of the wireless user device 130.

As described herein, a user may interact with a user device 130 to submit, via computer network 120, a new search request associated with a new transaction to the machine-learning based platform implemented on server(s) 102. The server(s) 102 may be configured to execute, via one or more processor(s) of the server(s) 102, a search engine optimization component. As described herein, the search engine optimization component may be configured to receive the new search request from a user device of the user and to, based on the new search request and the user action score, generate a search engine offer associated with the new transaction. The search engine offer may include one or more targeted advertisements for the user, and, in certain embodiments may include one or more dynamic coupons related to the targeted advertisement.

The server(s) 102 may transmit, via computer network 120, the search engine offer to the one or more computing devices 112, 114, and 116 of various search engine market participants 110. As described herein, at least one of the computing devices 112, 114, and 116 of various search engine market participants 110, for example, the computing device 112 of a first search engine market participant, may transmit, via computer network 120, an acceptance or confirmation indicating that the first search engine market participant desires the search engine offer to appear, or otherwise be displayed with, the search results that will be returned to the user device in response to the new search request. In some embodiments, in determining whether to accept (or decline) a particular search engine offer, a computing device 112, 114, and/or 116 of the various search engine market participants 110 may access the memories or database(s) 104, via computer network 120, in order to retrieve any of the user's search requests, transactional details, and/or user profile information. The computing device 112, 114, and/or 116 of the various search engine market participants 110 may use such information to, for example, perform their own analyses to determine whether to accept or decline a search offer, which may include, for example, a determination of whether a search market participant desires that the user become a new consumer or user of the search engine market participant's products or services. For example, as described herein, a search market participant, via its own algorithms on computing device 112, 114, and/or 116 may determine that a particular user is a good fit, or represent a typical target market, for a particular product or service issue such that the search market participant provides or issues, via the machine-learning based platform, a dynamic coupon to a user in order to entice the user to purchase, try, or otherwise use the product or service of the search engine market participant.

As an additional example, the machine-learning based platform may communicate a search engine offer to the search engine market participants 110, which may then be evaluated by such search engine market participants 110. As part of this evaluation, the search engine market participants may access the machine-learning based platform (e.g., at server(s) 102) to assess the historical accuracy of the machine-learning-derived probabilities of purchase. As described herein, if the search engine offer is accepted by one of the search engine market participants, a targeted advertisement and possibly a dynamic coupon is combined with search results and transmitted to the user's device 130. If a dynamic coupon is transmitted, it may be recorded in the user's digital bank, as associated with a user's user profile on server(s) 102, as described herein.

In various embodiments, the search engine market participants 110 pay a fee to the machine-learning based platform operator for the opportunity to place, or the actual placement of, the targeted advertisement of the accepted search engine offer in the user's search results. In some embodiments, the various search engine market participants 110 may bid against one another, such that the search engine market participant agreeing to pay the machine-learning based platform operator the highest fee would win, or otherwise purchase the right, to display the search offer in the user's results.

In some embodiments, the server(s) 102 may also include a search engine. The search engine may be configured to execute on the one or more processor(s) of the server to generate user search engine results based on user search engine requests. In such embodiments, the server(s) 102 may return, via computer network 120, the search engine results and, where search engine offer has been accepted by a search engine market participant, the targeted advertisement of the search engine offer to the user device.

In other embodiments, an acceptance by a search engine market participant, as received by server(s) 102, may cause transmission, via computer network 120, of the user's search request to a remote search engine on a remote computing device 107. In one embodiment, the remote search engine could be a cloud-based search engine of the operator of the machine-learning based platform. In other embodiments, the remote search engine may be a third-party search engine such as Google, Yahoo, Bing, etc. In either embodiment, the remote search engine may generate the search results. In one embodiment, the search results generated by the remote search engine may be returned to the server(s) 102 from the remote search engine before the search results (and any targeted advertisements of the related search engine offer) are returned to the user device in response to the user's new search request. In other embodiments, the targeted advertisement of the search engine offer may be sent to the remote search engine on the remote computing device 107 and the search results generated by the remote search engine may be combined with the targeted advertisement and subsequently returned to the user device from the remote search engine.

As described herein, a search engine offer may be associated with a new transaction. In some embodiments, the new transaction may be for a product or service that the user has searched for in the past, has just searched for in the new search request submitted to the server(s) 102, or has never searched for, but is instead based on the user's information including, for example, the user's transactional details and/or user profiles. For example, the new transaction may be associated with any of (1) an existing product or service already purchased by the user; (2) a competing product or service that competes with or is similar to an existing product or service already purchased by the user; or (3) a product or service determined based on any one or more of the users search requests, transaction details, profile information of the user, or other information described herein.

A user, operating a user device 110, may engage in a transaction, for example, for a purchase of goods or services of one or more online or physical merchants 140 participating with, or otherwise using, the machine-learning based platform. For example, each of the online or physical merchants 140 may operate an electronic computing device 142-146. For example, a first merchant may be an online merchant operating computing device 142. The computing device 142 may be, for example, a server hosting an online shopping service, website, portal, or similar online electronic storefront accessible via computer network 120. In such an embodiment, a user may, via a user device 130, purchase one or more goods or services from the first merchant via computing device 142. As described herein, in some embodiments, the user may apply all or part of the user's purchasing units (and, in some embodiments, dynamic coupon value) towards a transaction with the first merchant via computing device 142. For example, the user may purchase a new laptop via the first merchant's online shopping website at computing device 142 by applying all or part of the user's purchasing units to the transaction. As described herein, the user may have received the purchasing units when the user, or others on behalf of the user, provided the user's information to the machine-learning based platform on server(s) 102.

Other merchants, including, for example, a second and third merchant, may operate further computing devices 144 and 146 and may also participate with the machine-learning platform at server(s) 102. For example, computing device 146 of the third merchant, similar to the computing device 142 of the first merchant, may also provide an online storefront (e.g., via a website, webpage, etc.) and may be accessible via computer network 120. The third merchant may provide similar or different products or services than that of the first merchant. A second merchant operating computing device 144 may be a physical store based merchant that operates one or more physical stores 145. In some embodiments, the physical store merchant may have an online storefront (e.g., via a website, webpage, etc.) similar to that of the first and third merchants. In other embodiments, the second merchant may have no online storefront, but may participate with the machine-learning based platform at server(s) 102 via a computing device 144, where the computing device 144 would be operable by the second merchant to, for example, communicate with server(s) 102 to implement various features related to the machine-learning based platform, e.g., accepting purchasing units from users at physical store 145, transmit user transaction details to the server(s) 102 for associating with the user's profile, or other functionality described herein.

In various embodiments, each of the online or physical merchants 140, as participants to the machine-learning based platform, would accept as payment for transactions (e.g., purchases) the purchasing units and dynamic coupon value as distributed to the users of the machine-learning based platform of server(s) 102. For example, in some embodiments, a user may apply a dynamic coupon against a transaction with the merchants 140. In some embodiments, the dynamic coupon may have been generated or adjusted by the machine-learning platform at server(s) 102 and/or search engine market participants 110, where the dynamic coupon was generated as part of, or was experienced by the user as part of, a targeted advertisement of a search engine offer. As described herein, the dynamic coupon may have a coupon value (e.g., denominated in purchasing units, dollars, or other currency) that can be applied against the purchase price of transaction (e.g., good or service) offered by one of the merchants 140.

In various embodiments, and as described herein, the user, via a user device 130, and upon engaging in a transaction with a merchant 140, may choose various delivery or scheduling options. Such options may include requesting a good to be delivered (e.g., via FedEx or UPS) to the user's home. Another option may include scheduling a service for a particular date or time. In other embodiments, the user, via a user device 130, may specify that the user will pick up a good, or receive a service, at a merchant's physical store, e.g., such as physical store 145.

Figure 2:
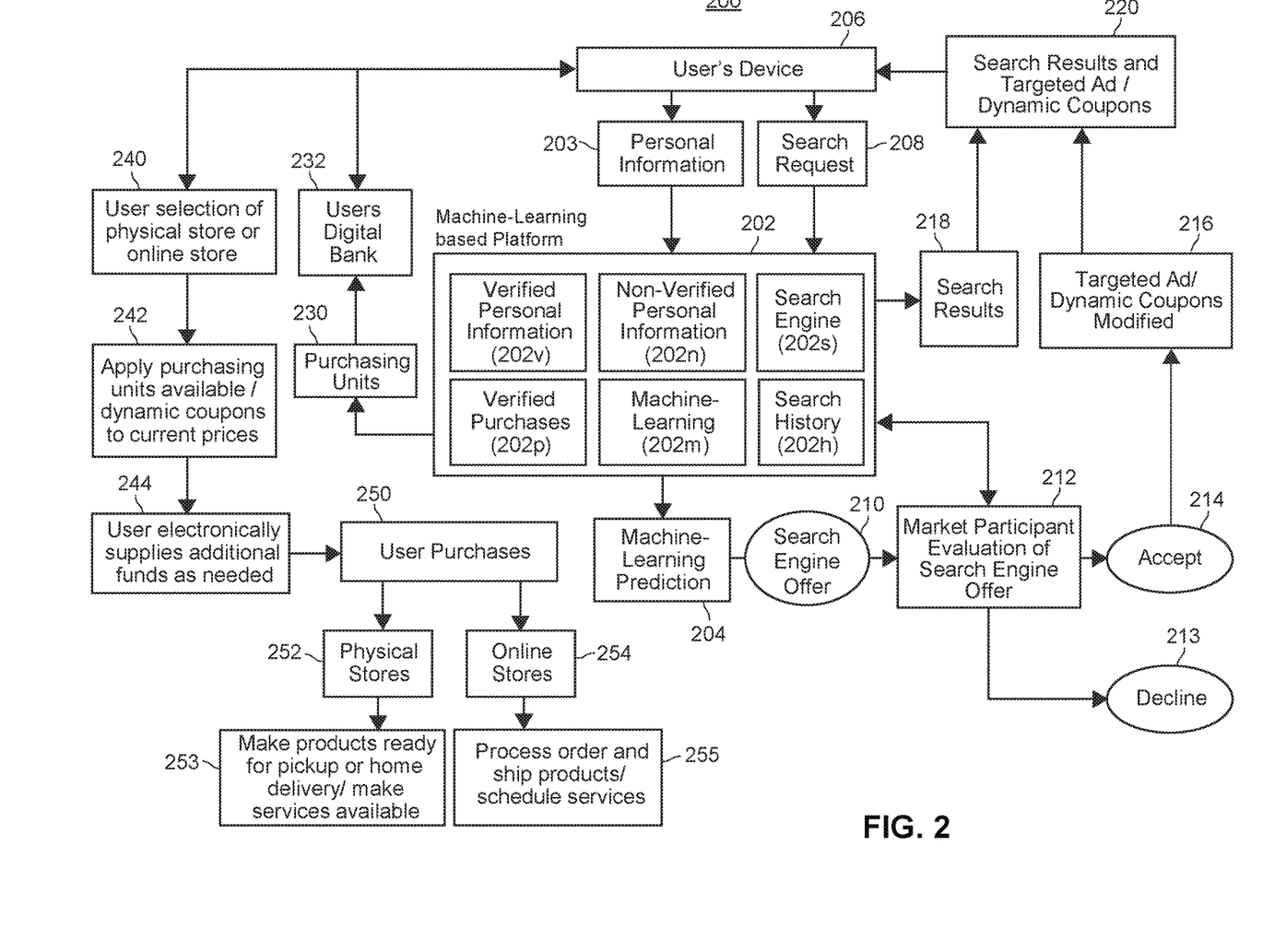
FIG. 2 illustrates a flow diagram depicting various example aspects of the machine-learning based platform of FIG. 1.

FIG. 2 illustrates a flow diagram 200 depicting various example aspects of the machine-learning based platform of FIG. 1. The machine-learning based platform 202 of FIG. 2 may be implemented on server(s) 102 as described with respect to FIGS. 1 and 4. In the embodiment of FIG. 2, the machine-learning based platform 202 is shown as an example that includes various software components, data, and information (e.g., search history 202h, machine-learning component 202m, non-verified purchase information 202n, verified purchases 202p, search engine functionality 202s, and verified purchase information 202v) each executing on, stored on, or otherwise associated via server(s) 102. In the embodiment of FIG. 2, the software components, data, and information (e.g., 202h, 202m, 202n, 202p, 202s, and 202v) are configured to optimize search engine results by connecting search engine users operating user devices 130, search engine market participants operating computing devices 110, and physical and online stores operating computing devices 140. For example, at block 206, a user, via a user device 130, may submit various search requests to the machine-learning based platform 202, where such search requests are stored on in the memory of server(s) 102 and/or via database(s) 104 as the user's search history 202h. As another example, the user, via the user device 130, may transmit personal information to the machine-learning based platform 202 which may include profile information including verified personal information 202v or non-verified personal information 202n as described herein. The user, via the user device 110, may also transmit personal information to the machine-learning based platform 202 which may include verified purchases 202p (e.g., transaction details). The machine-learning based platform 202 may also implement software components, including machine-learning component 202m and search engine optimization component 202s as further described herein. It is to be understood that each of the software components, data, and information (e.g., 202h, 202m, 202n, 202p, 202s, and 202v) are examples, and that different configurations, or numbers of, such software components, data, and information may be implemented in different embodiments, configurations, implementations or otherwise in accordance with the teachings herein.

Figure 4:
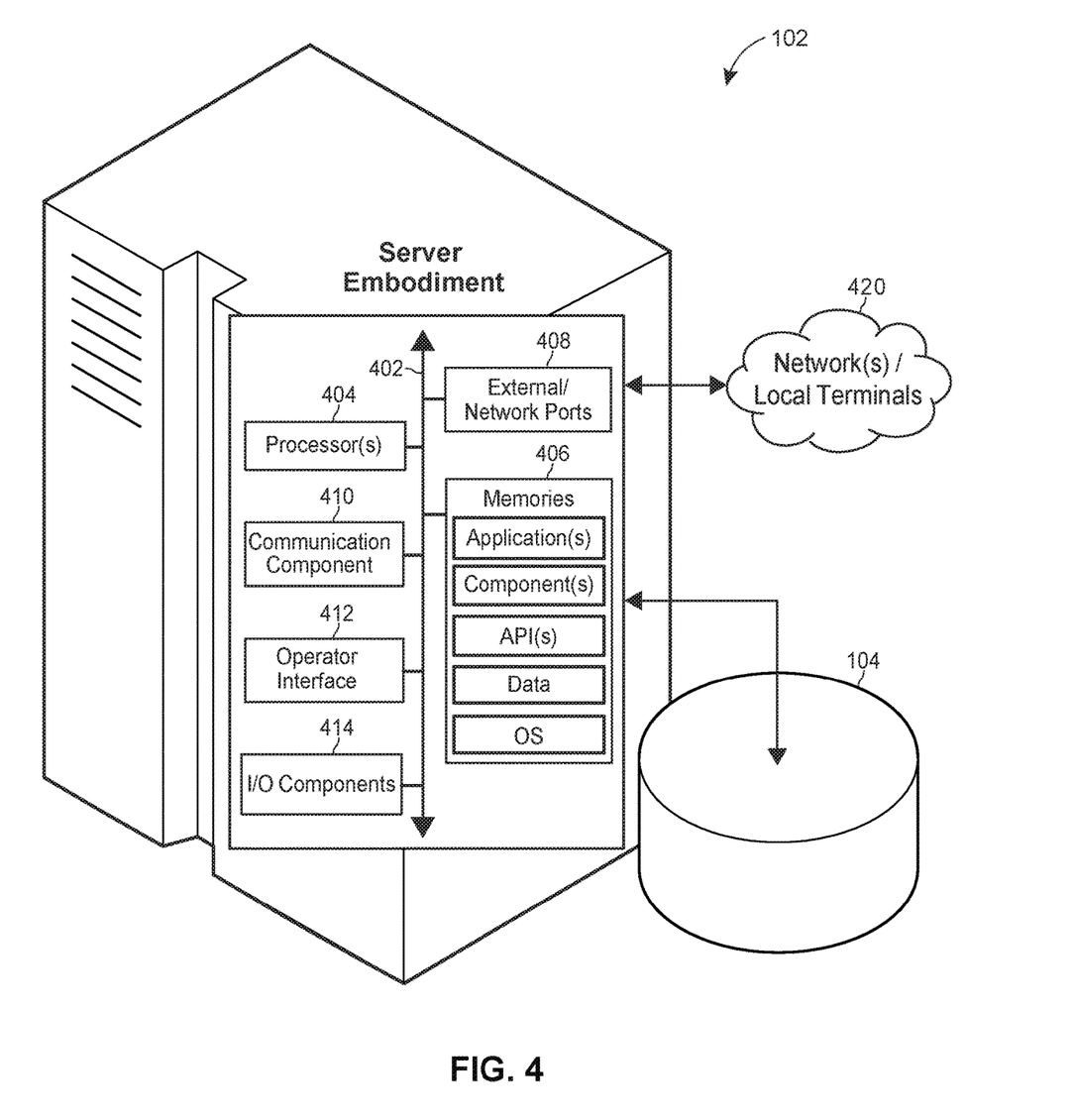
FIG. 4 illustrates an embodiment of a server of the machine-learning based platform of FIG. 1.

As described with respect FIGS. 1 and 4, the machine-learning based platform 202 operates one or more server(s) 102 that include one or more processors and one or more memories. As shown in FIG. 2, with respect to blocks 203 and 208, the machine-learning based platform 202 may be configured to receive, via a computer network (e.g., computer network 120), one or more search requests of a user (208), and personal information of the user (203). The personal information 203 may include, for example, one or more transaction details (e.g., current or past purchases, i.e., verified purchases 202p) of the user, and/or profile information of the user. The profile information of the user may include, for example, insurance payment(s) for an automobile owned by the user, real estate tax receipt(s) of the user, or other personal information of the user, including, e.g., information regarding interests, hobbies, and/or particular affinities to certain products, services, brands, etc. of the user. The personal information 203 may be stored or associated, in the server(s) 102 memory and/or database 104, as verified purchases 202p (e.g., transaction details), verified personal information 202v, or non-verified personal information 202n. In some embodiments, verified personal information 202v may be information provided by the user himself or herself, or information provided from a merchant based on direct interaction (e.g., past purchases, transactions, etc.) with the user. Similarly, in some embodiments non-verified personal information 202n may be information received about the user, but where such information was not based on direct interaction with the user. For example, non-verified personal information 202n could include information regarding a user's home address, phone number, age, etc. that may have been determined from public records, but not otherwise verified. Search requests 208 may also be received by the machine-learning based platform 202 and stored or associated, in the server(s) 102 memory and/or database(s) 104, as the user's search history 202h.

The machine-learning based platform 202 may also be configured to generate or update a user profile of the user. The user profile may be associated with, for example, in the one or more memories of the server(s) 102 and/or database 104, the search history 202h, verified purchases 202p (e.g., transaction details), verified personal information 202v, or non-verified personal information 202n, or other profile information of the user. For example, the user profile may be associated with the search history 202h, verified purchases 202p (e.g., transaction details), verified personal information 202v, or non-verified personal information 202n, or other profile information of the user, via a relational database (e.g., database(s) 104) through tables, columns, or relational keys that link or otherwise associate the various data or information to the user via the user's profile. The user profile may have a unique identifier, or other unique method of assigning or associating the user profile to the user, such that the machine-learning based platform 202 can look up and associate the user profile when receiving information (e.g., personal information 203 and/or search requests 208) from the user or as otherwise described herein.

The machine-learning based platform 202 may also execute, e.g., on server(s) 102, a machine-learning component 202m. The machine-learning component 202m may be trained, or otherwise configured, to predict (block 204), based on a user's one or more search requests (e.g., search history 202h), the user's one or more transaction details (e.g., verified purchases 202p), and/or the user's profile information (e.g., any one or more of the user's verified personal information 202v or non-verified personal information 202n), a user action score defining a probability of the user to engage in a new transaction. The new transaction may be associated with, for example, an existing product or service already purchased by the user. In other embodiments, the new transaction may be associated with a competing product or service that competes with or is similar to an existing product or service already purchased by the user. For example, if the user's verified purchases 202p reveal purchases of X3 Vitamin Shampoo by the user in the past, then the machine-learning component 202m may determine that a certain product (e.g., "V3 Vitamin Shampoo"), which competes with the X3 Vitamin Shampoo product, is a possible new transaction for the user. In still further embodiments, the new transaction may be associated with a product or service determined by the machine-learning component 202m based on any one or more of the user's one or more search requests (e.g., search history 202h), the user's one or more transaction details (e.g., verified purchases 202p), and/or the user's profile information (e.g., any one or more of the user's verified personal information 202n or non-verified personal information 202n).

The machine-learning component 202m, e.g., the model of the machine-learning component 202m, may be trained using a supervised or unsupervised machine-learning program or algorithm. The machine-learning program or algorithm may employ a neural network, which may be a convolutional neural network, a deep learning neural network, or a combined learning module or program that learns in two or more features or feature datasets in a particular areas of interest. The machine-learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine-learning algorithms and/or techniques. Machine-learning may involve identifying and recognizing patterns in existing data (such as products or services that are routinely purchased together by users, or products or services that are typically purchased by certain users having or being associated with certain user profile information, search requests, and/or transactional details) in order to facilitate making predictions for subsequent data (to predict whether a certain user would engage in a new transaction, e.g., engage in a purchase of a particular product or service).

Machine-learning model(s), such as those of machine-learning component 202m, may be created and trained based upon example (e.g., "training data,") inputs or data (which may be termed "features" and "labels") in order to make valid and reliable predictions for new inputs, such as testing level or production level data or inputs. In supervised machine-learning, a machine-learning program operating on a server, computing device, or otherwise processor(s), may be provided with example inputs (e.g., "features") and their associated, or observed, outputs (e.g., "labels") in order for the machine-learning program or algorithm to determine or discover rules, relationships, or otherwise machine-learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine-learning, the server, computing device, or otherwise processor(s), may be required to find its own structure in unlabeled example inputs, where, for example, multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine-learning techniques.

In FIG. 2, the machine-learning component 202m may use a user's one or more search requests (e.g., search history 202h), the user's one or more transaction details (e.g., verified purchases 202p), and/or the user's profile information (e.g., any one or more of the user's verified personal information 202v or non-verified personal information 202n) as features to train the machine-learning component 202m's model against labels that may include new, competing, different, similar, or the same products or services, that may represent new transactions that the user is expected to engage in. As shown at block 204, the output of the model of the machine-learning component 202m may be a user action score that defines a probability of the user to engage in the new transaction.

By determining the user action score, the machine-learning based platform 202, e.g., via the machine-learning component 202m, may quantify the user's desirability of certain products or services to search engine market participants. The machine-learning based platform 202 may use the action score to determine price points for search engine offers as sent to search engine market participants and/or by determining the quantity of purchasing units 230 to issue the user's digital bank 232 as described herein. For example, in some embodiments, the machine-learning component 202m may determine a quantity of user purchasing units to issue based on a user's one or more search requests (e.g., search history 202h), the user's one or more transaction details (e.g., verified purchases 202p), and/or the user's profile information (e.g., any one or more of the user's verified personal information 202n or non-verified personal information 202n). The end result can include an economic analysis of the probability of a new transaction (e.g., a new purchase) to be made by the user. As described herein, search engine market participants may receive this analysis (e.g., via a search engine offer), and/or with their own algorithms (e.g., at computing devices 112-116) decide whether or not to accept the search engine offer, and, in so doing, make a payment to the machine-learning based platform 202 operator in order to transmit a targeted advertisement of the search engine offer to the user.

The machine-learning based platform 202 may also execute, e.g., via the server(s) 102, a search engine optimization component 202s. The search engine optimization component 202s may be configured to receive a new search request 208 from a user device 206 of the user. The user device 206 may be a user device 130 as described herein for FIG. 1. In some embodiments, the user profile of the user may be updated to further associate the user profile with, in the one or more memories of the server(s) 102 and/or database 104, the new search request 208. In some embodiments, the new search request 208 may be used by the machine-learning component 202m to make predictions as described herein. For example, in certain embodiments, the new search request 208 may cause the machine-learning component to update the user action score. Thus, in such embodiments, when a user submits a new search request 208 to the machine-learning based platform 202, its machine-learning component 202m may combine the new search request with other information (e.g., prior search history 202h) of the user and use such updated information to make predictions regarding probabilities of the user to engage in new transactions, e.g., as associated with new or existing products or services offered by merchants 140 as described herein.

In addition, the new search request 208 may cause the search engine optimization component to generate, based on the new search request 208 and the user action score, a search engine offer 210 associated with the new transaction. As described herein, the search engine offer may include a targeted advertisement for the user. In certain embodiments, the search engine offer 210 or its targeted advertisement may include a dynamic coupon. The dynamic coupon may be associated with the new transaction, such that the dynamic coupon may be applied to a purchase price of the new transaction, e.g., to lower the overall price to the user. In some embodiments, the dynamic coupon may also include a purchasing unit value, or other coupon value described herein, and an expiration date. In still further embodiments, the purchasing unit value or the expiration date may be modified by either the machine-learning based platform, and/or a search engine market participant 110, before the targeted advertisement is returned to the user device.

The machine-learning based platform 202, e.g., via servers(s) 102, may be further configured to transmit, via the computer network 120, the search engine offer 210 to one or more computing devices 112-116 (e.g., servers) of one or more corresponding search engine market participants 110 (e.g., advertisers). The machine-learning based platform 202, e.g., via servers(s) 102, may receive, via the computer network 120, an acceptance 214 of the search engine offer 210 from at least one of the computing devices 112-116 of at least one of the one or more search engine market participants 110. In some embodiments, in determining whether to accept 214 (or decline 213) the search engine offer 210 at block 212, a search engine market participant 110, via its computing device (e.g., 112-116), may accesses the machine-learning based platform 202, e.g., via server(s) 102, to retrieve any of the user's one or more search requests (e.g., search history 202h), the user's one or more transaction details (e.g., verified purchases 202p), and/or the user's profile information (e.g., any one or more of the user's verified personal information 202v or non-verified personal information 202n).

An acceptance by a search engine marketing participant 110 may cause the targeted advertisement 220 of the search engine offer 210 and search results 218 to ultimately be returned to the user device 206 in response to the new search request 208. The targeted advertisement 220 of the search engine offer 210 may be displayed via the user's device 206 offering the new transaction (e.g., a similar or competing product to the user's profile information) to the user together with the returned search results 218. In some embodiments, the acceptance of the search engine offer 210 from the at least one of the one or more search engine market participants 110 requires a payment or agreement to pay an operator of the machine-learning based platform 202.

In embodiments, the search engine market participant 110 accepting a search engine offer 210 may modify a dynamic coupon associated with a search engine offer's targeted advertisement. For example, at block 212, a search engine market participant 110 may receive search engine offer 210. The search engine market participant 110 may determine to accept 214 the search engine offer 210. At block 216, the search engine market participant 110 may determine to modify the purchasing unit value or the expiration date of a dynamic coupon associated with the targeted advertisement of the search engine offer 210 before the targeted advertisement 220 is ultimately returned to the user device 206. In this way, the machine-learning based platform 202 incentivizes information flows that enable search engine market participants 110 to deliver and manage dynamic coupons for search-engine users.

The dynamic coupons disclosed herein are dynamic because the search engine market participants control the value and expiration date of the dynamic coupons, which were initially generated based on analyses by the machine-learning based platform 202, e.g., the machine-learning component 202m, utilizing the information (e.g., 202h, 202n, 202v, and 202p) of the search engine users. For example, a search engine market participant 110 may be promoting a certain product (e.g., V3 Vitamin Shampoo) which competes with a different product (e.g., X3 Vitamin Shampoo). If the user's verified purchases 202p, or other information, reveals large purchases of X3 Vitamin Shampoo in the past, the search engine market participant 110 may decide to increase the value of the dynamic coupon (or lengthen the expiration date) in order to entice or incentivize the user to purchase the V3 Vitamin Shampoo.

In some embodiments, the machine-learning based platform 202 may include a search engine configured to execute on server(s) 102. In such embodiments, the search engine is configured to generate the search engine results 218 based on the new search engine request 208, and the server(s) 102 are configured to return the search engine results 218 and targeted advertisement of any accepted search engine offer (e.g., search engine offer 210) to the user device 206.

In other embodiments, an acceptance 214 by a search engine market participant 110 may cause the transmission of the new search request to a remote search engine (e.g., remote search engine 107), where the remote search engine 107 generates the search results 218. In some embodiments, the remote search engine 107 could be a cloud-based search engine of the operator of the machine-learning based system. In other embodiments, the remote search engine 107 may be a third-party search engine such as Google, Yahoo, Bing, etc. In either of the remote search engine embodiments, the search results may be returned to the server(s) 102 from the remote search engine 107 before the search results 218 and targeted advertisement 220 are returned to the user device 206. In the alternative, the targeted advertisement 220 may be sent to the remote search engine 107 and the search results and targeted advertisement 220 may be returned to the user device 206 from the remote search engine 107.

In various embodiments, once the targeted advertisement 220 is displayed in the user's device 206, the user may select to save a dynamic coupon associated with the targeted advertisement. In such embodiments, the dynamic coupon may be associated, e.g., in the one or more memories of the server(s) 102 and/or database(s) 104, with the user profile as describe herein.

Accordingly, with respect to FIG. 2, a new search request 208 may be communicated to the machine-learning based platform 202. A search engine offer 210 may be generated by the machine-learning component 202m, and may be based on an assessment of the probability of the user engaging in a new transaction, e.g., making a purchase. As described herein, the search engine offer 210 may include a targeted advertisement, that itself may include a dynamic coupon and, if accepted 214 by a search engine market participant 110 (e.g., after an evaluation 212 by a search engine market participant 110), the targeted advertisement, may be combined with search engine results 218 returned the user's device 206. Thus, a search engine market participant's acceptance of the search engine offer may reflect the perceived desirability to have the particular user as a future customer of the search engine market participant.

Figure 3:
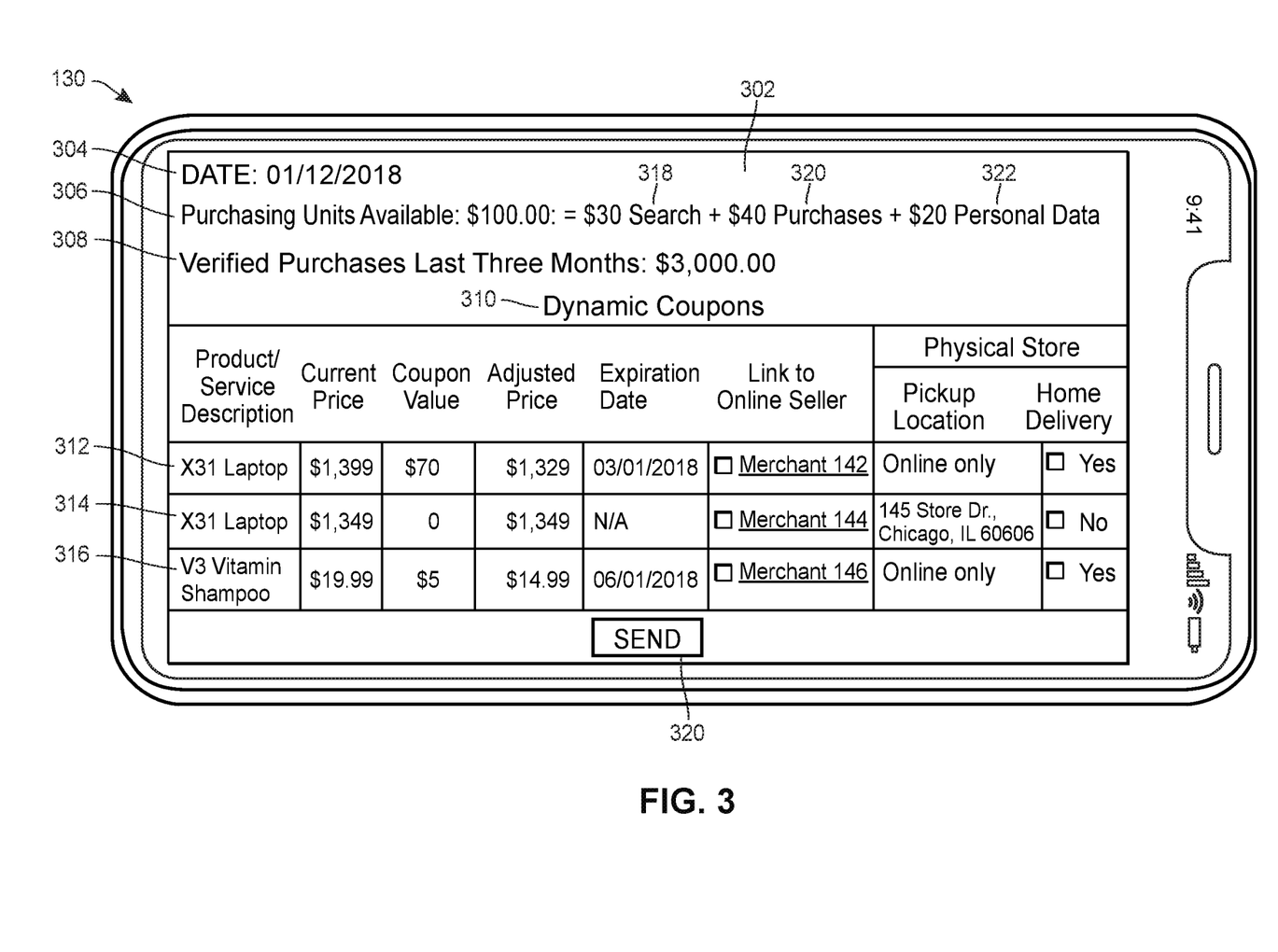
FIG. 3 illustrates an embodiment of a user's device of FIGS. 1 and 2 depicting the user's purchasing units and dynamic coupons in accordance the present disclosure.

FIG. 3 illustrates an embodiment of a user's device 130 of FIGS. 1 and 2 depicting the user's available purchasing units 306 and dynamic coupons 310 in accordance the present disclosure. The user's device 130 of FIG. 3 shows a screen of a digital bank application (app) 302. The digital bank app may be implemented on the user device 130 via Objective-C running on Apple iOS or Java running on Google Android. The digital bank app 302, via one of more transceivers of the user device 130, may be in electronic communication (wired or wireless commination as described herein), via computer network 120, with the server(s) 102 of the machine-learning based platform 202.

In general, the digital bank app 302 illustrates the contents of the user's digital bank and provides the user with the ability to make a purchase, e.g. using dynamic coupons. As described herein, a focal point of motivation for a user is the purchasing units that users earn for the provision and use of their information to the machine-learning based platform 202. For example, the user's search frequency/requests (e.g., search history 202h), verified purchases 202p, personal information (e.g., 202v and 202n), and overall desirability for targeted advertisements are continually assessed by the machine-learning component 202m in order to determine and transmit purchasing units 230 to the user's digital bank 232. Users are aware that their purchasing units are at least partly determined by the amount and quality of the information provided to the machine-learning based platform 202. As such, the purchasing units incentivize users to make purchases via physical stores and online stores of merchants (e.g., merchants 140) that participate in the machine-learning based platform 202.

The display screen of the digital bank app 302 depicts the purchasing units (shown in dollars) available to the user and the user's verified purchases made over the last three months (although it is to be understood that other configurations, such as other displays showing any information, and across any time periods, for the information described herein is contemplated). The remainder of the display screen shows details of outstanding dynamic coupons, including product description, current product price, coupon value, adjusted product price, and expiration date. Specifically, the digital bank app 302 depicts a current date 304 (e.g., Jan. 12, 2018) and a number of purchasing units (e.g., $100) available 306 to the user. In the embodiment of FIG. 3, the total purchasing units available 306 ($100) may represent purchasing units received by the user for user activity associated with the machine learning platform as described herein. For example, in various embodiments, the machine learning platform may allocate purchasing units to the user's digital bank 232 based on different user activities. For example, in the embodiment shown for FIG. 3, purchasing units available 306 ($100) may be the sum of purchasing units received for user search activity 318 ($30 search), purchasing units received for user purchases 320 ($40 purchases), and purchasing units received for the user submitting profile information 322 ($20 personal data). In an embodiment, the machine learning component 202$m$ may assign values for the user's past search requests 208 equal to $30, the user's past purchases 202$p$ equal to $40, and the user's personal data 202$v$ and 202$n$ equal to $20. These increases of purchasing units in the user's digital bank 232 represent both payments for assistance in determining user action scores to predict future purchases in response to advertisements and incentives for users to continue their participation. It is to be appreciated herein, however, that other variations are contemplated herein, where other purchasing unit amounts or variations may be utilized and against the same or different currencies. The digital bank app 302 also depicts an amount of verified purchases 308 (e.g., $3,000) that the user has engaged in in the past three months. The verified purchases 308 may relate to the user's verified purchases 202$p$ as described for FIG. 2 and elsewhere herein. As indicated via digital bank app 302, the user engaged in $3,000 worth of transactions in the past three months.

FIG. 3 also shows a number of dynamic coupons 310, including dynamic coupons 312-316 that the user saved to his or her user profile. Each of the dynamic coupons 312-316 may be those that were offered to the user via a targeted advertisement as described herein. Each of the dynamic coupons 312-316 includes coupon details, including a description of the product or service (e.g., the new transaction identified earlier by the machine-learning component of the machine-learning platform 202), the current price of the product or service, the dynamic coupon value, the adjusted price lowered by the value of the coupon, the expiration date of the dynamic coupon, a link to the online seller (e.g., which relate to merchants 140 in the present example), a pickup location (if available via a physical store, e.g., physical store 145), and a home delivery option.

For example, as shown in FIG. 3, dynamic coupon 312 is for an "X31 Laptop" (e.g., a new transaction identified earlier by the machine-learning component of the machine-learning platform 202), with a current price of $1,399, a dynamic coupon value of $70, an adjusted price of $1,329 (reflecting the $70 coupon applied to the $1,399 price), an expiration date of the dynamic coupon of Mar. 1, 2018, and a link to the online seller (e.g., the first merchant operating online storefront at computing device 142). Because the first merchant operating online storefront at computing device 142 is online only, as indicated in dynamic coupon 312, a pickup location is not available. Thus, the user is able to select the home delivery option for dynamic coupon 312. If a home delivery option is selected, a new adjusted price may be calculated and displayed which includes the delivery charges.

As another example, as shown in FIG. 3, dynamic coupon 314 is also for an "X31 Laptop" (e.g., a new transaction identified earlier by the machine-learning component of the machine-learning platform 202), with a current price of $1,349, a dynamic coupon value of $0, an adjusted price of $1,349 (reflecting the $0 coupon applied to the $1,349 price), no applicable expiration date, and a link to the online seller (e.g., the second merchant operating online storefront at computing device 144), and an address indicating a pickup location because the second merchant operating online storefront at computing device 144 has a physical store 145. In the example of dynamic coupon 314, no home delivery exits. However, in alternative embodiments, the user would be able to select the home delivery option for dynamic coupon 314.

As a further example, as shown in FIG. 3, dynamic coupon 316 is for "V3 Vitamin Shampoo" (e.g., a new transaction identified earlier by the machine-learning component of the machine-learning based platform 202), with a current price of $19.99, a dynamic coupon value of $5, an adjusted price of $14.99 (reflecting the $5 coupon applied to the $19.99 price), an expiration date of the dynamic coupon of Jun. 1, 2018, and a link to the online seller (e.g., the second merchant operating online storefront at computing device 146). Because the third merchant operating online storefront at computing device 146 is online only, as indicated in dynamic coupon 316, a pickup location is not available. Thus, the user is able to select the home delivery option for dynamic coupon 316.

In an embodiment, by clicking on the link of a dynamic coupon (e.g., "Merchant 144" for dynamic coupon 314) of a merchant (e.g., of the second merchant operating computing device 144), the corresponding product price ($1,349) may be displayed, that may also show shipping costs (not shown). Similarly, clicking on physical store pickup location may show the corresponding pickup address. A third option may allow the user to select home delivery (if available) and observe the corresponding product price, including any home delivery charge. The user may complete a purchase transaction by selecting the send button 320.

In some embodiments, the dynamic coupons 312-316 may have been generated via the machine-learning based platform 202. As described herein, the machine-learning based platform 202 may receive fees from search engine market participants 110 for connecting online merchants 140 to users. As described herein, the merchants indicated via the digital bank app 302 may be determined by the machine-learning component 202$m$ that analyzes competing product prices offered by physical and online stores and other information. In some embodiments, the machine-learning based platform 202 may operate such that the profits of the operator of the machine-learning based platform 202 are optimized from fees received from search engine market participants 110. In some embodiments, the merchants 140 may be the same as, or different from, the search engine market participants 110, but in any event, the operator of the machine-learning based platform 202 may collect fees from the merchants 140 and/or the search engine market participants 110. Alternatively, the firm owning the machine-learning based platform 202 may have its own physical and online stores (not shown) that are shown on the digital bank app 302 when a specific product or service is available through an owned store.

The user device 130 may use the dynamic coupons and purchasing units of the user's digital bank to make purchases (e.g., such as engaging in new transactions identified earlier by the machine-learning component of the machine-learning platform 202) with the merchants 140. For example, as shown in FIG. 2, a user profile, as stored on the machine-learning based platform 202, may be associated with a digital bank 232 that tracks, stores, and/or otherwise associates purchasing units 230 of a user. For example, the user's purchasing units and user profile may form the digital bank 232 of the user through the machine-learning based platform 202. In some embodiments, the digital bank may be a third-party bank that accepts, transmits, and/or manages purchasing units 230 on behalf and/or with the user, for example, via the user's profile at the machine-learning based platform 202.

As described herein, in various embodiments, a user's digital bank 232 acts as a depository for payments to the user in the form of purchasing units 230. The purchasing units 230 may be, for example, denominated in dollars, points, or some other currency or variation thereof. In various embodiments, the purchasing units are usable for engaging in new transactions, e.g., for buying products in online storefronts or physical stores of merchants (e.g., via merchants 140) who are part of, participate in, or otherwise utilize the machine-learning based platform 202. For example, and as shown in FIG. 2, at block 230, the machine-learning-based platform 202 may issue purchasing units to a user. The purchasing units may be issued as a result of the user, or merchants 140, supplying information about the user, such information including search requests 208, personal information 203, and/or user purchases 250 (e.g., transactional details), that are stored by the machine-learning based platform 202 as the related user search history 202h, verified personal information 202v, non-verified personal information 202n, and verified purchases 202p.

In various embodiments, the purchasing units 230 may be associated with the user's user profile, e.g., in the memory of the server(s) 102 and/or database 104, after the machine-learning based platform 202 receives, e.g., search requests, transaction details, or profile information of the user. The purchasing units may be associated, in the machine-learning based platform 202 (e.g., in the memories of server(s) 102 and/or database 104), with the user's profile thereby making the user's purchasing units available to the user (block 232), and redeemable via merchants 140.

As shown in FIG. 2, and for various embodiments, at block 206, a user via a user device may initiate a new transaction (e.g., a purchase of a product or service). The new transaction may be a new transaction as identified earlier by the machine-learning based platform 202 as described herein. The new transaction may be initiated from the digital bank app 302 shown in FIG. 3. For example, at block 240, to initiate the transaction, the user may select a link of a dynamic coupon associated with a physical or online store of a merchant (e.g., "Merchant 144" of dynamic coupon 314 for the second merchant operating computing device 144). At block 242, the user may apply his or her purchasing units 306 (as stored or associated in the user's digital bank 232) and/or dynamic coupon value to the new transaction. For example, the user may apply his or purchasing units to engage in the new transaction identified earlier by the machine-learning based platform 202 as described herein. For example, in an embodiment where the new transaction is associated with the product shown in dynamic coupon 312 (i.e., the "X31 Laptop"), the user may apply his or her $100 purchasing units against the current price of the product, thereby decreasing the adjusted price from $1,329 to the final overall cost of $1,229.

As shown in the embodiment of FIG. 3, no dynamic coupon (or a zero valued dynamic coupon) was issued as part of a targeted advertisement of the search engine offer generated by the search engine optimizer component the machine-learning based platform 202, such that the user does not have any dynamic coupon value for the dynamic coupon 314 to apply towards the purchase of the X31 Laptop. However, in an alternative embodiment, the second merchant operating computing device 144 may wish to compete with the first merchant operating computing device 142. As shown in FIG. 3, the first merchant operating computing device 142 has offered dynamic coupon 312 with a coupon value of $70. Thus, the after-coupon cost (adjusted price) to the user, after applying the dynamic coupon value of dynamic coupon 312 is $1,329. This is lower than the $1,349 after-coupon cost to the user when buying from the second merchant operating computing device 144. Accordingly, in an alternative embodiment where the second merchant operating the computing device 144 wanted to compete with the first merchant operating computing device 142, and, thus, win the business of the user, the second merchant operating the computing device 144 may offer a dynamic coupon with a coupon value of $49 that decreases the after-coupon cost to the user to $1,300 which is below that of the first merchant operating computing device 142 offering the same X31 Laptop, and thus yielding a new overall cost to the user of $1,200, which would be after applying all available purchasing units of $100. Thus, the second merchant operating computing device 144 may modify the dynamic coupon 314, including the coupon value and/or the coupon expiration date, as described herein. The user may then use the modified dynamic coupon value at block 242, and apply its value to decrease to the overall cost to the user.

At block 244, the user may be required to supply additional funds to complete the transaction. For example, in an embodiment where the new transaction involved the product shown in dynamic coupon 314 (i.e., the "X31 Laptop"), the user may apply his or her $100 purchasing units to the $1,349 adjusted price of the product yielding a remaining balance of $1,249. The user may supply additional funds in a traditional manner, e.g., via a credit card, PayPal payment, or other payment method, to meet the remaining $1,249 balance.

At block 250, the transaction details of user's purchase of the X31 Laptop may be transmitted by the merchant involved in the transaction, e.g., the second merchant operating computing device 144, to the machine-learning based platform 202. Such transactions details may be stored as the user's verified purchase 202p information, and may be used by the machine-learning based component 202m for future iterations, search engine offers, new transactions, or otherwise as described herein. Thus, information for machine-learning purposes may include historical data on actual products purchased (e.g., 202p) to complement personal information (e.g., 202n and 202v), history of the user's past search requests (e.g., 202h). The user may also receive purchasing units as a result of the new transaction details being sent to the machine-learning based platform 202.

At block 252, in an embodiment where the user selects a merchant with a physical store (e.g., the second merchant operating computing device 144 and having physical store 145), then, at block 253, the merchant may make the purchased product (or service) available for pickup, home delivery, or scheduling as the case may be.

At block 254, in an embodiment where the user selects a merchant with an online store (e.g., the third merchant operating computing device 146), then at block 255 the merchant may process the order to ship the purchased product to the user's home or other address, or schedule service for completion at the user' home or other address, as the case may be.

In some embodiments, the payment by the user for a product or service may initiate a payment by the merchant to the operator of the machine-learning based platform 202. In other embodiments, however, no payment may be issued, for example, in embodiments where the merchant and the machine-learning based platform 202 are owned and/or operated by the same entity.

FIG. 4 illustrates an embodiment of a server(s) 102 of the machine-learning based platform of FIG. 1. As illustrated in FIG. 4, the server(s) 102 may be a computing device that may include one or more processor(s) 404 as well as one or more computer memories 406. The memories 406 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memories 406 may store an operating system (OS) (e.g., Microsoft Windows, Linux, Unix, etc.) capable of facilitating the functionalities as discussed herein. The memories 406 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, the machine-learning component and/or the search engine optimization component, where each are configured to facilitate their various functionalities discussed herein. It should be appreciated that one or more other applications may be envisioned and that are executed by the processor(s) 404.

The processor(s) 404 may be connected to the memories 406 via a computer bus 402 responsible for transmitting electronic data, data packets, or otherwise electronic signals to and from the processor(s) 404 and memories 406 in order to implement or perform the machine readable instructions, methods, processes, elements or limitations, as illustrated, depicted, or described for the various flowcharts, illustrations, diagrams, figures, and/or other disclosure herein.

The processor(s) 404 may interface with the memory 406 via the computer bus 402 to execute the operating system (OS). The processor(s) 404 may also interface with the memory 406 via the computer bus 402 to create, read, update, delete, or otherwise access or interact with the data stored in the memories 406 and/or the database(s) 104 (e.g., a relational database, such as Orcale, DB2, MySQL, or a NoSQL based database, such as MongoDB). The data stored in the memories 406 and/or the database 104 may include all or part of any of the data or information described herein, including, for example, the one or more search requests, the one or more transaction details, and the profile information of the user.

The server 102 may further include a communication component 410 configured to communicate (e.g., send and receive) data via one or more external/network port(s) 408 to one or more networks or local terminals 420, such as computer network 120 and/or terminal 106 described herein. In some embodiments, the communication component 410 may include a client-server platform technology such as ASP.NET, Java J2EE, Ruby on Rails, Node.js, a web service or online API, responsive for receiving and responding to electronic requests. The processor(s) 102 may implement the communication component 410 that may interact, via the computer bus 402, with the memories(s) 406 (including the applications(s), component(s), API(s), data, etc. stored therein) and/or database(s) 104 to implement or perform the machine readable instructions, methods, processes, elements or limitations, as illustrated, depicted, or described for the various flowcharts, illustrations, diagrams, figures, and/or other disclosure herein. According to some embodiments, the communication component 410 may include, or interact with, one or more transceivers (e.g., WWAN, WLAN, and/or WPAN transceivers) functioning in accordance with IEEE standards, 3GPP standards, or other standards, and that may be used in receipt and transmission of data via the external/network ports 408.

The server 102 may further include or implement an operator interface 412 configured to present information to an administrator or operator and/or receive inputs from the administrator or operator. As shown in FIG. 4, the operator interface 412 may provide a display screen (e.g., via terminal 106). The server 102 may also provide I/O components 414 (e.g., ports, capacitive or resistive touch sensitive input panels, keys, buttons, lights, LEDs), which may be directly accessible via or attached to server 102 or may be indirectly accessible via or attached to terminal 106. According to some embodiments, an administrator or operator may access the server(s) 102 via the operator interface 412 and/or I/O components 414 to review information, make changes, input training data, and/or perform other functions.

In some embodiments, the server(s) 102 may perform the functionalities as discussed herein as part of a "cloud" network or may otherwise communicate with other hardware or software components within the cloud to send, retrieve, or otherwise analyze data or information described herein.

In general, a computer program or computer based product in accordance with some embodiments may include a computer usable storage medium, or tangible, non-transitory computer-readable medium (e.g., standard random access memory (RAM), an optical disc, a universal serial bus (USB) drive, or the like) having computer-readable program code or computer instructions embodied therein, wherein the computer-readable program code or computer instructions may be installed on or otherwise adapted to be executed by the processor(s) 404 (e.g., working in connection with the respective operating system in memories 406) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, Actionscript, JavaScript, HTML, CSS, XML, etc.).

ADDITIONAL CONSIDERATIONS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location, while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A machine-learning based system configured to optimize search engine results, the machine-learning based system comprising:
a server, the server including one or more processors and one or more memories, the server configured to receive, via a computer network, one or more search requests of a user, one or more transaction details of the user, and profile information of the user, wherein the server is further configured to generate or update a user profile of the user, wherein the user profile is associated with, in the one or more memories, the one or more search requests, the one or more transaction details, or the profile information of the user;
a machine-learning component configured to execute on the one or more processors of the server, the machine-learning component further configured to train a machine learning model using a machine-learning feature dataset comprising each of: the one or more search requests, the one or more transaction details, and the profile information, wherein the machine learning model is configured to generate, with the machine-learning feature dataset, a user action score defining a probability of the user to engage in a new transaction; and
a search engine optimization component configured to execute on the one or more processors of the server, the search engine optimization component further configured to receive a new search request from a user device of the user and, to, upon receiving the new search request, generate a market participant-based search engine offer based on each of (1) the new search request and (2) the user action score, the market participant-based search engine offer configured for transmission to one or more search engine market participants, the market participant-based search engine offer including a targeted advertisement for the user,
wherein the generation of the market participant-based search engine offer causes the server, during the new search request, to:
transmit, via the computer network, the market participant-based search engine offer to one or more computing devices of the one or more search engine market participants, and receive, via the computer network, an acceptance of the market participant-based search engine offer from at least one of the computing devices of at least one of the one or more search engine market participants, the acceptance of the at least one of the one or more search engine market participants causing the targeted advertisement and search results to be transmitted to the user device in response to the new search request.

2. The machine-learning based system of claim 1, further comprising a search engine configured to execute on the one or more processors of the server, the search engine configured to generate the search engine results based on the new search engine request, and wherein the server is further configured to transmit the search engine results to the user device.

3. The machine-learning based system of claim 1, wherein the acceptance causes transmission, via the computer network, of the new search request to a remote search engine, wherein the remote search engine generates the search results.

4. The machine-learning based system of claim 3, wherein the search results are returned to the server from the remote search engine before the search results and targeted advertisement are returned to the user device.

5. The machine-learning based system of claim 3, wherein the targeted advertisement is sent to the remote search engine, and wherein the search results and targeted advertisement are returned to the user device from the remote search engine.

6. The machine-learning based system of claim 1, wherein the new transaction is associated with at least one of: (1) an existing product or service already purchased by the user; (2) a competing product or service that competes with or is similar to an existing product or service already purchased by the user; or (3) a product or service determined based on any one or more of the one or more search requests, the one or more transaction details, or the profile information of the user.

7. The machine-learning based system of claim 1, wherein the server is further configured to associate, in the one or more memories, the user profile with one or more user purchasing units, the one or more user purchasing units redeemable at one or more merchants.

8. The machine-learning based system of claim 7, wherein the one or more user purchasing units are associated with the user profile after the server receives one or more of the one or more search requests, the one or more transaction details, or the profile information of the user.

9. The machine-learning based system of claim 8, wherein the machine-learning component determines a quantity of the one or more user purchasing units based on the one or more of the one or more search requests, the one or more transaction details, and the profile information of the user.

10. The machine-learning based system of claim 7, wherein at least a subset of the one or more user purchasing units are used by the user to engage in the new transaction with the one or more merchants.

11. The machine-learning based system of claim 7, wherein at least one of the one or more merchants transmit, via the computer network, to the server, at least a subset of the one or more transaction details.

12. The machine-learning based system of claim 1, wherein the profile information of the user includes at least one of verified profile information or non-verified profile information.

13. The machine-learning based system of claim 1, wherein the targeted advertisement includes a dynamic coupon, wherein the dynamic coupon is associated with the new transaction, and wherein the dynamic coupon includes a purchasing unit value and an expiration date.

14. The machine-learning based system of claim 13, wherein at least one of the purchasing unit value or the expiration date is modified before the targeted advertisement is returned to the user device.

15. The machine-learning based system of claim 13, wherein the at least one of the computing devices of the at least one of the one or more search engine market participants modifies the purchasing unit value or the expiration date of the dynamic coupon before the targeted advertisement is returned to the user device.

16. The machine-learning based system of claim 15, where the at least one of the computing devices of the at least one of the one or more search engine market participants accesses the server to retrieve the one or more search requests of a user, the one or more transaction details of the user, or the profile information of the user.

17. The machine-learning based system of claim 13, wherein the dynamic coupon is associated, in the one or more memories, with the user profile.

18. The machine-learning based system of claim 1, wherein the at least one of the one or more search engine market participants outbids a remaining other one or more search engine market participants for an opportunity to accept the market participant-based search engine offer.

19. The machine-learning based system of claim 1, wherein the user profile is further associated, in the one or more memories, with the new search request.

20. The machine-learning based system of claim 19, wherein the new search request causes the machine-learning component to update the user action score.

21. The machine-learning based system of claim 7, wherein the one or more user purchasing units are based on different user activities.

22. A machine-learning based method for optimizing search engine results, the machine-learning based method comprising:
receiving via a computer network, at a server including one or more processors and one or more memories, one or more search requests of a user, one or more transaction details of the user, and profile information of the user;
generating or updating a user profile of the user to cause the user profile to become associated, in the one or more memories, with the one or more search requests, the one or more transaction details, or the profile information of the user;
training, via a machine-learning component executing on the one or more processors of the server, a machine learning model using a machine-learning feature dataset comprising each of: the one or more search requests, the one or more transaction details, and the profile information;
generating, via the machine learning model with the machine-learning feature dataset, a user action score defining a probability of the user to engage in a new transaction;
receiving via the computer network, at the server, a new search request from a user device of the user;
generating, via a search engine optimization component executing on the one or more processors of the server and upon receiving the new search request, a market participant-based search engine offer based on based on each of (1) the new search request and (2) the user action score, the market participant-based search engine offer configured for transmission to one or more search engine market participants, wherein the market participant-based search engine offer includes a targeted advertisement for the user;

transmitting from the server during the new search request, via the computer network, the market participant-based search engine offer to one or more computing devices of the one or more search engine market participants; and receiving at the server during the new search request, via the computer network, an acceptance of the market participant-based search engine offer from at least one of the computing devices of at least one of the one or more search engine market participants, the acceptance of the at least one of the one or more search engine market participants causing the targeted advertisement and search results to be transmitted to the user device in response to the new search request.

23. A tangible, non-transitory computer-readable medium storing instructions for optimizing search engine results, that when executed by one or more processors of a computing device, the computing device including one or more memories, cause the computing device to:

receive via a computer network, at the computing device, one or more search requests of a user, one or more transaction details of the user, and profile information of the user;

generate or update a user profile of the user to cause the user profile to become associated with, in the one or more memories, the one or more search requests, the one or more transaction details, or the profile information of the user;

train, via a machine-learning component executing on the one or more processors of the computing device, a machine learning model using a machine-learning feature dataset comprising each of: the one or more search requests, the one or more transaction details, and the profile information;

generate, via the machine learning model with the machine-learning feature dataset, a user action score defining a probability of the user to engage in a new transaction;

receive via the computer network, at the computing device, a new search request from a user device of the user;

generate, via a search engine optimization component executing on the one or more processors of the computing device and upon receiving the new search request, a market participant-based search engine offer based on based on each of (1) the new search request and (2) the user action score, the market participant-based search engine offer configured for transmission to one or more search engine market participants, wherein the market participant-based search engine offer includes a targeted advertisement for the user;

transmit from the computing device during the new search request, via the computer network, the market participant-based search engine offer to one or more computing devices of the one or more search engine market participants; and receiving at the computing device during the new search request, via the computer network, an acceptance of the market participant-based search engine offer from at least one of the computing devices of at least one of the one or more search engine market participants, the acceptance causing the targeted advertisement and search results to be transmitted to the user device in response to the new search request.

* * * * *